C. A. HARVEY.
AUXILIARY JOINT.
APPLICATION FILED JAN. 9, 1917.
1,233,228.
Patented July 10, 1917.
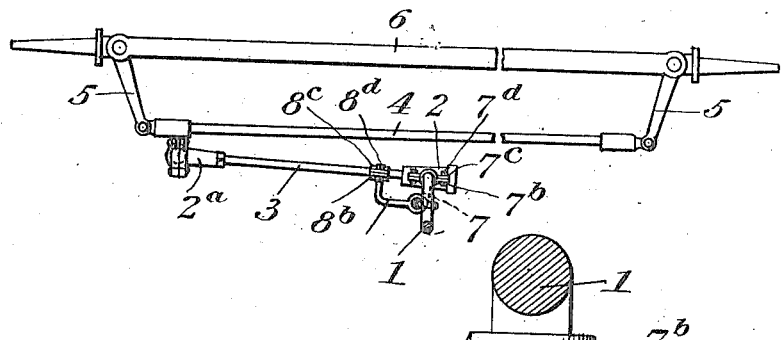
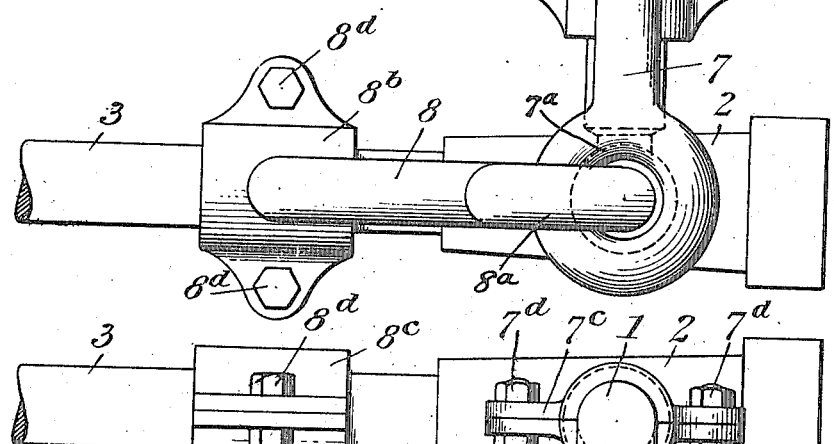
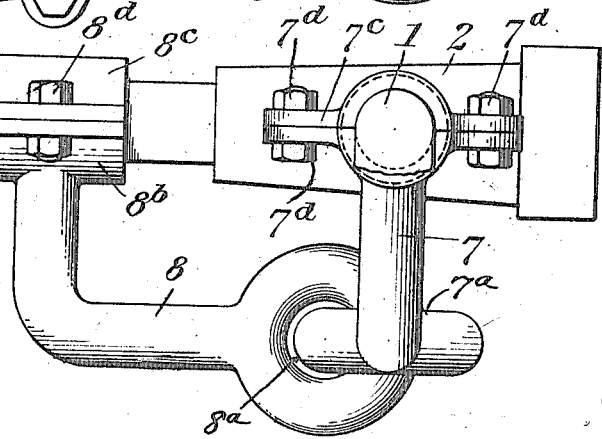
Witness
Fenton H. Pelt
Inventor
Charles A. Harvey
By Alexander Powell
Attorneys

UNITED STATES PATENT OFFICE.

CHARLES A. HARVEY, OF SOUTH AMBOY, NEW JERSEY.

AUXILIARY JOINT.

1,233,228.

Specification of Letters Patent. Patented July 10, 1917.

Application filed January 9, 1917. Serial No. 141,420.

*To all whom it may concern:*

Be it known that I, CHARLES A. HARVEY, a citizen of the United States, residing at South Amboy, in the county of Middlesex and State of New Jersey, have invented certain new and useful Improvements in Auxiliary Joints; and I hereby declare that the following is a full, clear, and exact description thereof, reference being had to the accompanying drawings, which form part of this specification.

This invention is a novel attachment particularly designed for use with steering gear connections of motor vehicles and the like, but useful in other applications as will be understood when the invention is apprehended. The object of the invention is to provide an auxiliary safety connection between operative relatively movable parts, such for example as the connection between the steering gear head or crank and the steering gear connecting rod or drag pin as it is sometimes called, so that in case the usual and normally operative main joint or connection between these parts should fail or break as a result of crystallization, friction, or vibration, the auxiliary connection will come into action, and prevent the parts dropping and enable the vehicle to be used until proper repairs can be made.

The invention in brief provides an auxiliary or loose joint beside the main joint or connection; which latter joint is primarily subjected to the wear and tear of actual use without affecting the auxiliary joint; but the latter stands ready to assume the work of the main joint and prevent accident in case the main joint should break, fail or otherwise become ineffective.

I will describe one embodiment of the invention as illustrated in the accompanying drawings and as applied to the connection between the steering crank and the steering gear connecting rod of an automobile of a well known type, to enable others to clearly understand the same; but it will be understood that I do not consider the invention restricted to this particular application of the invention nor to the particular construction shown, for when once understood it will be obvious that the invention could be employed with other steering gears or mechanisms to reinforce the main joint or joints between the parts and provide a safety auxiliary connection at such joint or joints. Furthermore I do not consider the invention restricted to the construction of auxiliary connection shown in the drawings and hereinafter described, but an explanation of such construction as illustrated in the drawings and one practical application thereof will enable others skilled in the art to readily comprehend the invention and its adaptability and utility not only in connection with automobile steering gear but elsewhere in the mechanical arts where such an auxiliary safety connection or joint may be desirable.

In the accompanying drawings:

Figure 1 is a detail view of part of the steering gear of an automobile, showing my novel auxiliary joint attachment applied in operative relation to the main joint between the steering crank and the steering gear connecting rod.

Fig. 2 is an enlarged elevation of such auxiliary connection applied to such steering crank and steering gear connecting rod.

Fig. 3 is a top plan view of Fig. 2.

In said drawings 1 designates one of the usual forms of steering cranks of an automobile; which is usually connected by means of a ball and socket joint of the well known type, indicated at 2, to one end of the steering gear connecting rod 3. The other end of rod 3 is usually connected by a similar joint, indicated at 2ª, to the rod 4 which connects the steering knuckles 5 that carry the front or steering wheels of the vehicle (not shown) and which knuckles are pivotally mounted in the usual manner on the axle 6. The aforesaid parts are only conventionally shown in the drawings; as they may be of any desired suitable construction well understood, such that by moving the crank 1, by the usual steering post (not shown) the steering gear connecting rod 3 will be moved right or left and the connecting rod 4 similarly moved and consequently the steering knuckles 5 turned to move the steering wheels to right or left to guide the machine in the usual manner.

It sometimes happens that owing to inherent weakness or to crystallization of parts caused by the strains and jars incident to usage of the machine, that the joints between the parts break, particularly the joint 2 between the steering crank 1 and the connecting rod 3 might break; and to prevent injury to the machine or operator in event of such main joint failing, my auxiliary joint attachment is applied.

In the present instance for example, I have shown my auxiliary joint attachment applied at the joint between the steering post 1 and the rod 3. This auxiliary joint may be varied in construction, but in the example illustrated it comprises a member 7 attached to the crank 1 and a corresponding member 8 attached to the rod 3. The member 7 has an eye 7ª on one end loosely engaging a corresponding eye 8ª on the end of member 8; the other end of the member 7 is adapted to be fixedly attached to the rod 1. As shown this attachment is in the form of a split clamp comprising a member 7ᵇ, to which member 7 is rigidly attached, and an opposed member 7ᶜ which is attached to the member 7ᵇ by means of bolts and nuts as at 7ᵈ; the members 7ᵇ and 7ᶜ firmly clamping crank 1 between them and rigidly attaching member 7 thereto. Similarly the member 8 may be rigidly attached to the rod 3 by means of clamp members 8ᵇ, 8ᶜ corresponding to the members 7ᵇ, 7ᶜ and united by bolts and nuts 8ᵈ.

It will be seen that the members 7 and 8 are attached so as to lie substantially at right angles to each other; and that eyes 7ª, 8ª rather loosely engage each other and form an auxiliary joint in a plane opposite and parallel with the main joint 2. The construction is preferably such that so long as the main joint 2 holds between the crank 1 and the rod 3 the auxiliary joint does not come into effective operation; but if for any reason the main joint fails, so that the crank 1 and rod 3 become disconnected, and, but for the presence of my auxiliary joint, allow rod 3 to drop and cause the driver to lose control of the machine,—then the said auxiliary joint comes into effective operation, and the driver still retains effective control of the machine through the auxiliary joint formed by the members 7 and 8; said auxiliary joint then constituting a dependable connection between the crank or crank arm on the steering head, and the connecting rod 3.

Obviously the specific form and proportions of the auxiliary joint are not essential features of the invention; the essentially novel feature being the provision of an auxiliary joint beside the main joint adapted, in event of breakage or failure of the major and primary joints, to come into effective operation and prevent disengagement of the parts.

While I have simply shown the auxiliary joint as applied at the joint between the steering crank and the connecting rod of an automobile steering gear, such auxiliary joints might be applied beside other joints between other operative parts liable to severe usage or wear.

What I claim is:

1. In combination with a main joint connecting relatively movable members; of an auxiliary joint connected with said members and adapted to connect the same in case the main joint gives way.

2. In combination relatively movable members and a main joint operatively connecting said members; with an auxiliary joint also connected with said members adjacent the main joint and coming into effective operation in the event that the main joint fails.

3. In combination with relatively movable members and a main joint operatively connecting said members; an attachment comprising opposite parts connected together to form a joint; said parts being connected to said relatively movable members, said auxiliary joint coming into effective operation if the main joint fails.

4. In combination with relatively movable members and a main joint operatively connecting said members; an attachment comprising opposite parts loosely connected together to form a joint; said parts being connected to said relatively movable members so as to keep the auxiliary joint adjacent the main joint; said auxiliary joint being normally ineffective but adapted to come into effective operation if the main joint fails.

5. In combination with a steering crank, a connecting rod, and a main joint pivotally connecting said rod to said crank; an auxiliary joint having its members connected to the steering crank and to said connecting rod; said auxiliary joint becoming effective if the main joint fails.

6. In combination with a steering crank, a connecting rod, and a main joint pivotally connecting said rod to said crank; an auxiliary joint having its members loosely engaged and detachably attached to the steering crank and to said connecting rod adjacent the main joint; said auxiliary joint becoming effective if the main joint fails.

In testimony that I claim the foregoing as my own, I affix my signature.

CHAS. A. HARVEY.